United States Patent [19]
Wirthman et al.

[11] Patent Number: 5,655,735
[45] Date of Patent: Aug. 12, 1997

[54] POST TRANSITION MOMENTUM MANAGEMENT

[75] Inventors: David J. Wirthman; John S. Higham, both of Mountain View; Michel B. Baylocq, Menlo Park; Peter Y. Chu, Palo Alto, all of Calif.

[73] Assignee: Space Systems Loral, Inc., Palo Alto, Calif.

[21] Appl. No.: 497,776

[22] Filed: Jul. 3, 1995

[51] Int. Cl.$^6$ ..................... B64G 1/28
[52] U.S. Cl. ..................... 244/165; 244/164
[58] Field of Search ..................... 244/164, 165, 244/169, 171; 364/459, 434

[56] References Cited

U.S. PATENT DOCUMENTS

| | | |
|---|---|---|
| 4,537,375 | 8/1985 | Chan . |
| 4,725,024 | 2/1988 | Vorlicek . |
| 4,767,084 | 8/1988 | Chan et al. . |
| 4,848,706 | 7/1989 | Garg et al. . |
| 4,931,942 | 6/1990 | Garg et al. . |
| 5,222,023 | 6/1993 | Liv et al. . |
| 5,349,532 | 9/1994 | Tilley et al. . |
| 5,459,669 | 10/1995 | Adsit et al. . |

FOREIGN PATENT DOCUMENTS

| | | |
|---|---|---|
| 0334485A2 | 9/1989 | European Pat. Off. . |
| 0347585A1 | 12/1989 | European Pat. Off. . |
| 0394897A1 | 10/1990 | European Pat. Off. . |
| 0507460A1 | 10/1992 | European Pat. Off. . |

*Primary Examiner*—Andres Kashnikow
*Assistant Examiner*—Tien Dinh
*Attorney, Agent, or Firm*—Perman & Green, LLP

[57] ABSTRACT

A low cost, fuel efficient solution to the problem of avoiding high yaw errors in communications satellites after station keeping maneuvers is achieved by adding a selectable function to the LTMM controller which allows it to calculate roll momentum based on measured yaw attitude error data from the yaw DIRA. The so calculated roll momentum is used to trigger roll unloads, which will reduce the yaw attitude error. This solution has the advantages that: it maintains yaw attitude error within the pointing budget; the fuel penalty is negligible; it can be made fully automatic; it can be disabled and not used; and, it requires only a very small addition to the firmware.

18 Claims, 3 Drawing Sheets

POST TRANSITION MOMENTUM MANAGEMENT

BACKGROUND OF THE INVENTION

1. Field of the Invention

The present invention relates to the control of earth-orbiting vehicles such as communications satellites and more particularly to a method and means for reducing satellite pointing errors due to yaw attitude errors following station keeping maneuvers.

2. Problem to be Solved

Communications satellites, such as Intelsat-VII FM1, have experienced large yaw attitude errors following north/south station keeping (S/K) maneuvers. The cause of the errors has been shown to be propellant shift or motion in the spacecraft that produces an internal momentum exchange. The magnitude of the errors poses a problem with regard to degrading the pointing performance of the spacecraft, causing it to exceed pointing requirements. This, in turn, causes some degradation of the communication payload signals, with the Ka and Ku band payloads being the most strongly effected.

There are several courses of action which can be taken in response to the problems posed by these phenomena. The available options include, for example, just accepting the large attitude errors, that is, make no modifications to the firmware and take no actions on orbit. This option, for spacecraft such as those of the Intelsat type and size, would result in a yaw attitude error of as much as 0.60 degrees. Since the ADCS transition mode yaw pointing budget is 0.30 degrees, such an error would cause the spacecraft to exceed pointing requirements. Also, due to quarter orbit coupling, the attitude error eventually moves from the yaw axis to the roll axis over a period of 6 hours. As the error moves into the roll axis, it is absorbed by the momentum wheels and subsequently dumped using unloads. As a result, the yaw attitude error can be expected to exceed the pointing budget for 2-4 hours. The long term momentum management (LTMM) controller is unable to fire roll unloads to reduce the yaw attitude error sooner than this because the yaw angle estimator has a six hour time constant.

Another of the options involves allowing the propellant shift to occur before the transition to on orbit mode. This involves spending approximately 15 minutes in either station keeping (S/K) mode or in an '8 msec PWPF' mode, both of which require additional fuel. More particularly, with the former approach, following an S/K mode maneuver, the spacecraft remains in S/K mode for an additional 15 minutes after the north/south (N/S) maneuver. This approach requires no modifications to the firmware. Remaining in S/K mode will allow the propellant movement to occur while the yaw axis is still under thruster control. The thrusters will maintain the yaw pointing within the ADCS S/K mode pointing budget of 0.05 degrees. There are two disadvantages to this approach. First, it will cause the roll and pitch axes to experience S/K errors for an additional 15 minutes. These errors are much larger than the on orbit pointing budget of 0.007 degrees for roll and 0.01 degrees for pitch. Second, this approach has a fuel penalty of approximately 11 kg in communications spacecraft such as contemplated.

With the latter approach, i.e., '8 msec' pulse width pulse frequency modulator (PWPF) mode, the same basic operation of remaining in S/K mode would be exercised, but with a reduced fuel penalty. In this option, after an S/K mode maneuver has been completed, during which the PWPF modulator operates with 16 msec pulsewidths, the spacecraft is commanded (via ground commands) to switch to '8 msec PWPF' mode, wherein a mask is used to reduce the 16 msec pulsewidth length to 8 msec. The control loops produce a requested analog control torque that is input to the PWPF modulator which produces a pulse train approximating the analog input signal. Accordingly, the spacecraft is in this mode a few minutes after the N/S maneuver and remains in this mode for approximately 15 minutes before executing a transition to on orbit mode. In the '8 msec PWPF' mode, the pitch axis is under wheel control, while the roll and yaw axes remain under thruster control. The thrusters use an 8 msec pulse width, rather than the 16 msec pulse width used for S/K mode. Pitch unloads are allowed in order to maintain the wheel speeds within their operating range. This approach has the same disadvantages as the former approach, but on a smaller scale. The roll and pitch axes will still experience S/K errors for an additional 15 minutes. There is still a fuel penalty, estimated at about 3 kg, versus 11 kg for remaining in S/K mode. Other options in this regard are to add the '8 msec PWPF' mode to the ADCS firmware in the final ROM version prior to launch or after launch using the reprogramming features of the ADCS firmware. The after launch mode would reside in RAM and require the operator to follow a slightly more complicated procedure than the prior to launch option.

It will accordingly be seen that it is a problem to control momentum accumulation due to propellant shift following a North/South station keeping maneuver in a spacecraft such as a communications satellite, and, while various solutions exist or have been proposed, it is desirable to achieve a solution which is comparatively simple to execute and which minimizes fuel consumption.

3. Objects

It is accordingly an object of the present invention to provide a method and means for controlling momentum accumulation due to propellant shift following a North/South station keeping maneuver in a spacecraft such as a communications satellite.

It is another object of the present invention to provide such a method and means for controlling momentum accumulation which is comparatively simple to execute and which minimizes fuel consumption.

It is a further object of the invention to provide a method and means which modifies the LTMM, rather than the S/K control mode, so that the momentum management functions in a wheel controlled mode rather than a thruster controlled mode.

SUMMARY OF THE INVENTION

The present invention is directed to solving the problem of controlling momentum accumulation due to propellant shift following a North/South station keeping maneuver in an orbiting spacecraft, such as a communications satellite, and involves controlling the spacecraft movement such that the propellant shift occurs after the transition to on orbit mode, and controlling the yaw attitude error with roll unloads. The roll unloads can be done manually, i.e., by direct operator action, but, preferably they are done automatically by adding a new option to the LTMM loop. In accordance with the invention, the spacecraft is caused to execute a transition to on orbit mode a few minutes after the N/S S/K maneuver so that the propellant shift will occur after the spacecraft is in on orbit mode, and the Digital Integrating Rate Assembly (DIRA) is used to control the yaw attitude error by means of the yaw DIRA and roll unloads. This requires only slight changes to the firmware.

The yaw DIRA may be left on for approximately an hour after transition to provide yaw attitude error information that is used in the roll momentum calculations for roll unloads.

When done manually, the operator watches the yaw DIRA angle data and upon the yaw angle reaching 0.30 degrees in either direction, he commands a manual thruster fire, thus, requiring no changes to the firmware. All parameters of the manual thruster fire can be predetermined so that the operator does not have to make a real time decision. The unload transients will be approximately double in size because the position prebiasing cannot be used.

The alternative and preferred embodiment is to make the manual operations fully automatic by making a very small addition to the firmware. The LTMM controller, which currently calculates roll momentum by integrating estimated roll torque, is adapted to allow it to calculate roll momentum based on measured yaw attitude error provided by the yaw DIRA, which is left on for approximately an hour following transition to on orbit mode. The LTMM controller then uses the calculated roll momentum to control roll unloads. Thus, the post transition momentum management (PTMM) of the invention functions in a wheel control mode rather than a thruster control mode.

The preferred embodiment reduces the fuel penalty, improves roll and pitch pointing, provides a bounding on yaw pointing error, and reduces ground operation complexity. It also provides uniformity of momentum management systems since the same controller is used to manage both long term momentum and post transition momentum.

DETAILED DESCRIPTION OF THE PREFERRED EMBODIMENTS

In order to maintain spacecraft, such as communications satellites, in proper orbit it is necessary to make orientation adjustments during their travel about the earth. These adjustments are typically accomplished using inertial devices and small thrusters to alter the craft's momentum. The thrusters require a supply of propellant which has a separate momentum from that of the craft. Consequently, there may be uncontrolled momentum accumulation, due to an internal momentum exchange caused by propellant shift, following a North/South station keeping maneuver of the spacecraft. On such occasions large yaw attitude errors have been found to occur in communications satellites, such as those of the Intelsat type and size. In the absence of some control, yaw attitude errors of as much as 0.60 degrees can result causing the spacecraft to exceed the pointing requirements of the ADCS transition mode yaw pointing budget of 0.30 degrees. Such yaw attitude errors, due to quarter orbit coupling, move from the yaw axis to the roll axis over a period of 6 hours. As the error moves into the roll axis, it will be absorbed by the momentum wheels and subsequently dumped using roll unloads. The yaw attitude error, then, can be expected to exceed the pointing budget for 2–4 hours since the long term momentum management (LTMM) controller is unable to fire roll unloads to reduce the yaw attitude error sooner than this because the yaw angle estimator has a six hour time constant.

The present invention provides a solution to this yaw error problem in the preferred embodiment by adding a selectable function to the LTMM controller which allows it to calculate roll momentum based on measured yaw attitude error from the yaw DIRA angle data following transition to on orbit mode. It should be understood that roll momentum and yaw attitude error are interrelated as follows. Roll momentum is proportional to rate and if left to exist will cause the spacecraft to spin. The on-board attitude controllers 'store' the momentum by various mechanisms. The pitch and yaw momentum are stored as speed changes in the momentum wheels. The roll momentum is stored as yaw attitude error. Basically, a yaw attitude error tilts the momentum vector slightly such that it has a component in the roll axis. This component is used to cancel the momentum which exists currently on the spacecraft. Thus, when yaw attitude error is controlled, roll momentum is controlled also, and vice versa.

Figure 1:
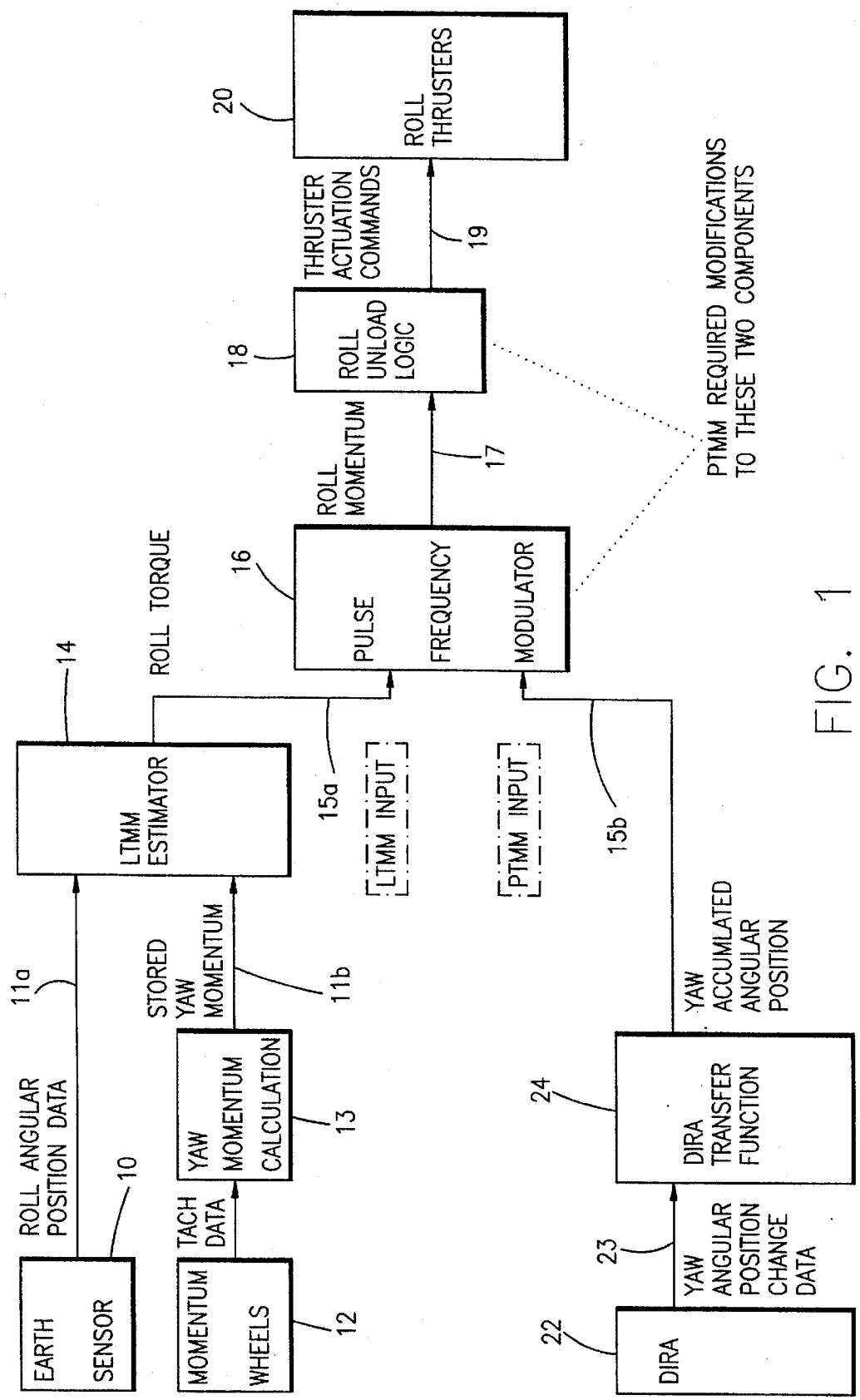
FIG. 1 is a block diagram of a post transition momentum management (PTMM) system in accordance with the present invention.

A block diagram of a post transition momentum management system in accordance with the present invention is shown in FIG. 1. As seen in the Figure, a typical LTMM controller includes components such as an Earth Sensor 10, that outputs Roll Angular Position Data, and Momentum Wheels 12, that provide Tach Data used by calculator 13 to calculate a Stored Yaw Momentum output, which outputs provide input signals 11a and 11b to an LTMM Estimator 14. Estimator 14 outputs an estimated Roll Torque signal 15a to a Pulse Frequency Modulator 16 which, in turn, outputs a signal 17 indicative of stored Roll Momentum, that is used by Roll Unload Logic 18 to produce Thruster Actuation Commands 19 to activate Roll Thrusters 20 and control roll unloads. This typical LTMM controller is modified according to the invention to include a function wherein a signal is accepted from DIRA 22 that is indicative of the yaw accumulated angular position or attitude errors occurring during station keeping maneuvers.

More particularly, DIRA 22 determines the amount of change in angular position since the last sampling for each of the roll, pitch, and yaw axes. Since the time between samplings is fixed, this data can be used to calculate angular rate. It also can be integrated to obtain accumulated angular position. Accordingly, data indicative of the yaw axis accumulated angular position, i.e., yaw angular position change data 23 from DIRA 22 that is integrated by means of a DIRA Transfer Function 24 into a Yaw Accumulated Angular Position signal 15b, is used in the invention in place of the Roll Torque signal 15a from The Earth Sensor data, the Momentum Wheels Tach Data, and LTMM Estimator 14. The yaw DIRA data signal 15b is input directly into the LTMM Pulse Frequency Modulator 16 which, it will be understood by those skilled in the art, may be appropriately modified to accept and process such an input as explained more fully below in connection with FIG. 2. For example, it will not use momentum feedback during receipt of this input since the feedback is provided for directly by the DIRA 22. The output 17 of Modulator 16 resulting from this input is fed to the Roll Unload Logic 18 which is also somewhat modified to process the signal as explained more fully below in connection with FIG. 3. For example, it does not use an initial delay or a prebias. However, gain switching and a blanking period after the unloads, during which all unloads are prevented, are still utilized.

In operation, the system of the invention is activated, for example, after an orbiting spacecraft in which it is incorporated is commanded to make a North/South station keeping adjustment maneuver. The spacecraft is then caused to execute a transition to on orbit mode a few minutes after the N/S maneuver. With this sequence the propellant shift will not occur until after the spacecraft is in on orbit mode. The yaw DIRA 22 is left on for approximately one hour after this transition to derive error information which is supplied as DIRA yaw data 15b to the LTMM Pulse Frequency Modulator 16. LTMM Modulator 16 is adapted to then use this error information to control the roll unloads by means of the Roll Unload Logic 18 and Roll Thrusters 20.

Figure 2:
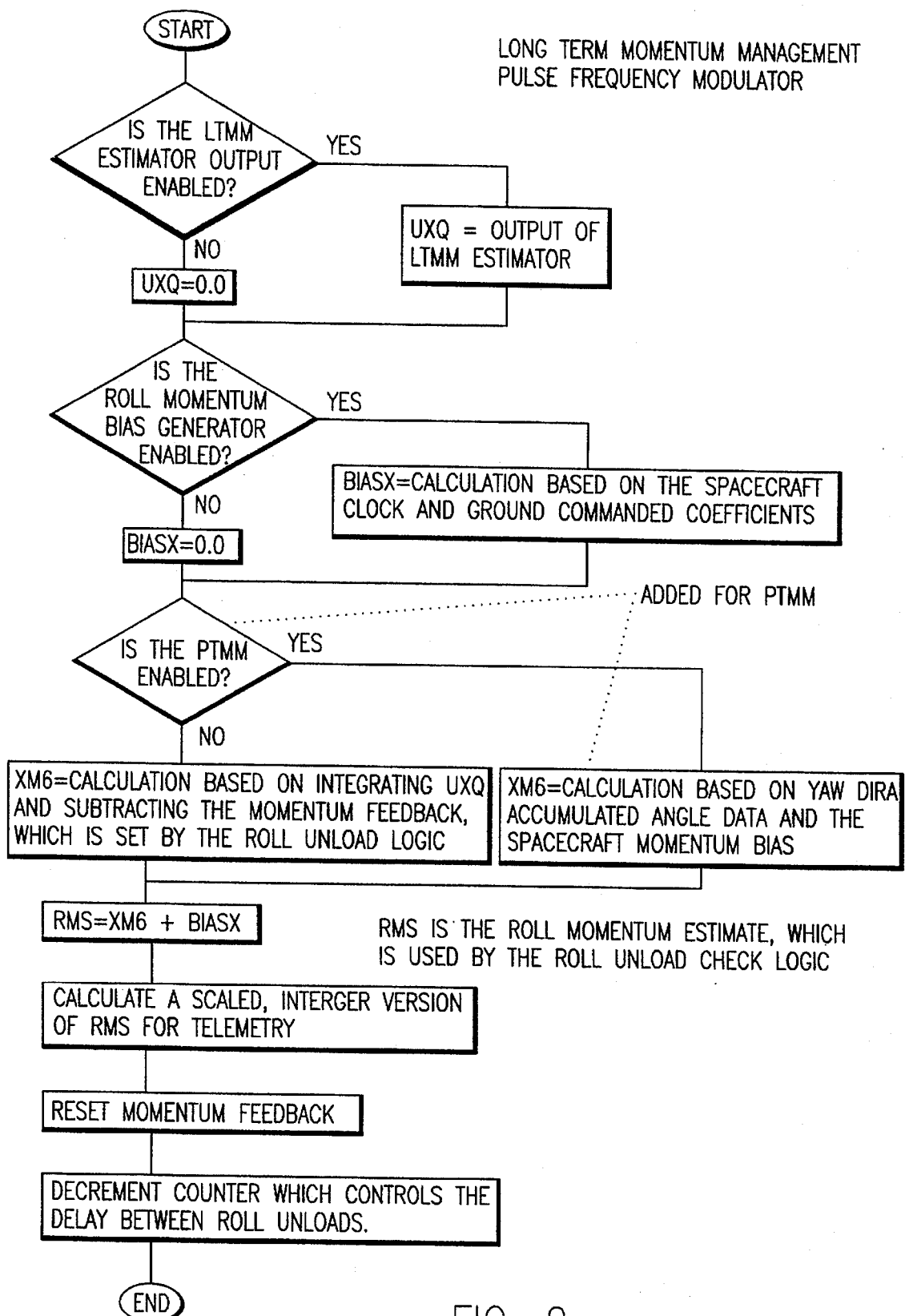
FIG. 2 is a flowchart diagram illustrating the operation of the Pulse Frequency Modulator shown in FIG. 1 for long term momentum management in accordance with the invention.

FIG. 2 shows an example of a firmware addition to the LTMM Pulse Frequency Modulator 16 that is illustrated in the form of a number of steps in keeping with the invention through which the Modulator 16 takes the input from the yaw DIRA 22 and converts it into a form usable by the Roll Unload Logic 18. It also applies the momentum feedback whenever a roll unload is fired. As seen in the Figure, following satellite transition to on orbit mode, the process STARTs and the roll torque is determined. The roll momentum bias, BIASX, is then calculated from the spacecraft clock and ground commanded coefficients. The PTMM Modulator 16 may then be enabled to receive as input the output 15b from the yaw DIRA 22, constituting yaw accumulated angular position data indicative of yaw attitude error. This input (15b) is processed in PTMM Modulator 16 and produces an estimated Roll Momentum, RMS, output 17 to Roll Unload Logic 18, after which a scaled, integer version of the RMS is calculated for telemetry and the momentum feedback is reset to ø. A suitable, preferably 32 bit, counter in the Roll Unload Logic 18 is used in combination with the unload blanking period counter to regulate the thrust actuation commands 19 to space the roll unloads. The spacing results in the thruster firing being in pulses, the timing or frequency of which is modulated in accordance with the information contained in the DIRA yaw data following the transition to on orbit mode.

Figure 3:
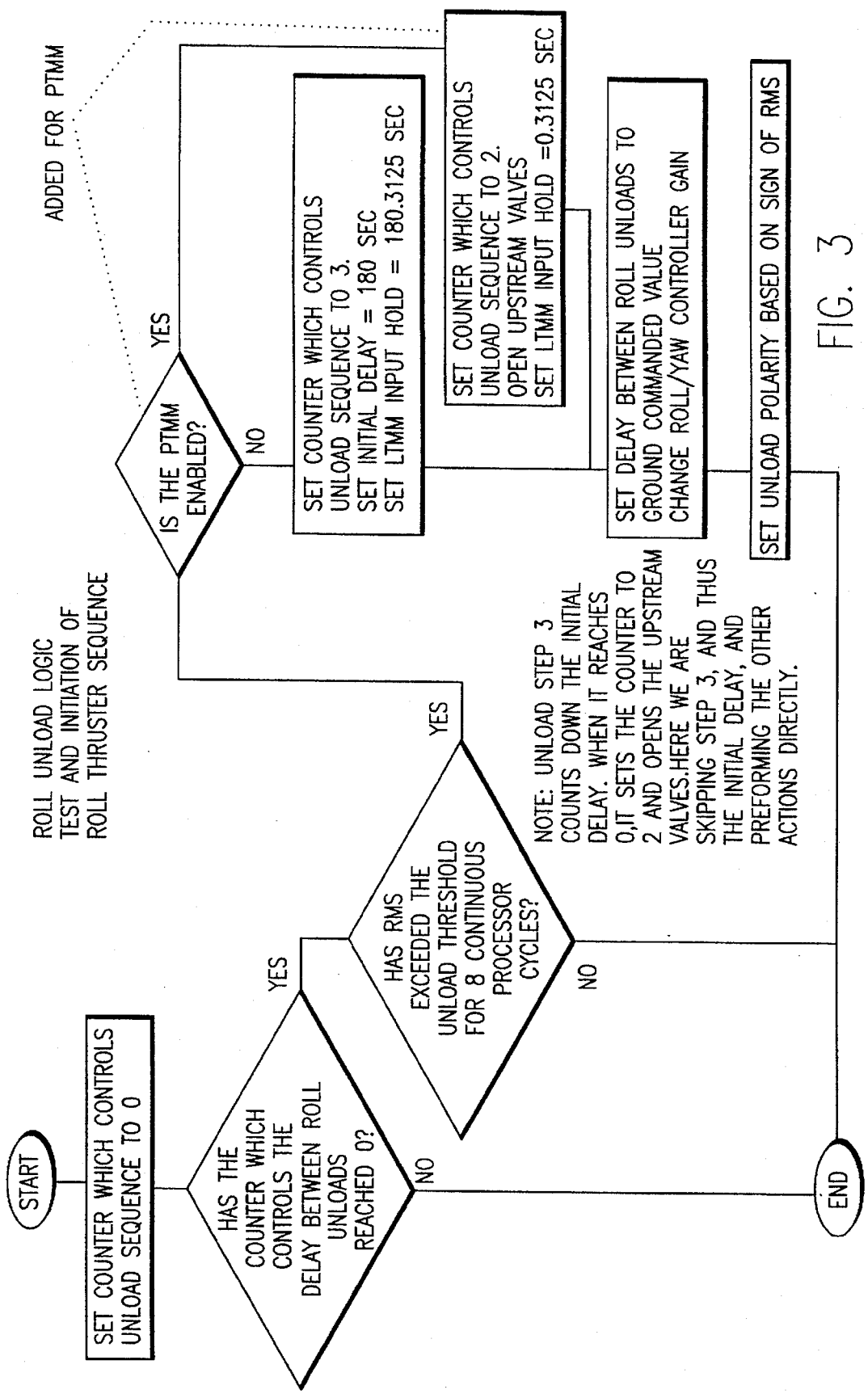
FIG. 3 is a flowchart diagram illustrating the operation of the Roll Unload Logic shown in FIG. 1 in the test and initiation of roll thruster sequence.

The operation of the Roll Unload Logic 18 in testing and initiating the roll thruster sequence is shown in FIG. 3. As seen in the Figure, at START, the counter which controls the unload sequence is set to zero. The Logic normally checks to determine if the counter which controls the delay between roll unloads has reached zero. If NO, the check ENDs, else, a check is made to determine if the RMS has exceeded the unload threshold for 8 continuous processor cycles. If NO, the check ENDs. However, if YES, a check is made to determine if the PTMM feature of the invention has been enabled. If NO, the counter which controls the unload sequence is set to 3, the initial delay is set to 180 sec and the LTMM input hold is set to 180.3125 sec. The initial delay is counted down and when it reaches zero, the counter is set to 2 and the upstream valves of the thrusters are opened to affect roll unloads. If the PTMM feature is enabled, the initial delay is avoided, the unload sequence controlling counter is set to 2, the upstream valves are opened and the input hold of the LTMM is set to 0.3125 sec.

Whether or not the initiation delay is avoided, the delay between roll unloads is then set in accordance with a ground commanded value. The roll/yaw controller gain is changed and unload polarity is set based on the sign of the RMS. The unload space or delay is measured from the initiation of one roll unload to the next initiation. Initiation occurs 180 seconds before the thruster fire when the PTMM feature is not enabled, but essentially immediately when it is. With the PTMM feature the thruster fire will be in pulses, the timing or frequency of which is modulated in accordance with the information contained in the DIRA yaw data following the transition to on orbit mode.

A simpler alternative embodiment involves manual control of the roll unloads. In this embodiment an operator watches the yaw DIRA angle data during the period after transition. When the yaw angle reaches 0.30 degrees in either direction, a thruster fire is manually commanded. All parameters of the manual thruster fire can be predetermined so that the operator does not have to make a real time decision. The LTMM controller input is not required and the unload transients will be approximately double in size because the position prebiasing cannot be used in this instance. However, the fuel penalty for this embodiment is negligible.

In summary, it will be seen that, in accordance with the invention, a low cost, fuel efficient solution to the problem of avoiding high yaw errors after station keeping maneuvers is achieved by adding a selectable PTMM function to the LTMM controller which allows it to calculate roll momentum based on measured yaw error from the yaw DIRA. The so calculated roll momentum is used to trigger roll unloads, which will reduce the yaw error. This solution has the advantages that it maintains yaw error within the pointing budget, the fuel penalty is negligible, it is fully automatic, it can be disabled and not used, and it requires only a very small addition to the firmware. The simple firmware modifications required will be readily determinable and achievable by those of skill in the art in the light of the foregoing description. An alternative manual control approach can be used if it is desired to not affect the existing firmware.

What is claimed is:

1. Apparatus for controlling momentum in a spacecraft having a long term momentum management (LTMM) controller, that estimates roll momentum, and having a yaw DIRA, that measures yaw error, comprising:

means for maintaining said yaw DIRA in the on condition, producing signals indicative of the yaw error measured, following a transition of the spacecraft to on orbit mode;

means, responsive to said yaw error indicative signals, for determining a roll momentum, based on the yaw error measured by said yaw DIRA while in the on condition following a transition of the spacecraft to on orbit mode, and producing a signal indicative of said determined roll momentum; and means, responsive to said signal indicative of said determined roll momentum, for controlling roll unloads.

2. Apparatus as in claim 1 wherein said means, responsive to said yaw error indicative signals, for determining a roll momentum, is incorporated in said LTMM controller.

3. Apparatus as in claim 2 further comprising means for disabling said LTMM controller from estimating roll momentum, prior to said means for determining roll momentum producing said signal indicative of said determined roll momentum.

4. Apparatus for controlling momentum in a spacecraft having a long term momentum management (LTMM) controller, that estimates roll momentum, and having a yaw DIRA, that measures yaw error, comprising:

means for maintaining said yaw DIRA in the on condition, producing signals indicative of the yaw error measured, following a transition of the spacecraft to on orbit mode;

means, responsive to said yaw error indicative signals, for producing a control signal; and means for controlling roll unloads in response to said control signal to control momentum in said spacecraft and wherein said controlling means comprises roll unload logic means including means for controlling thrust actuation commands to space the roll unloads.

5. Apparatus as in claim 4 wherein said means for controlling thrust actuation commands comprises a 32 bit counter in combination with an unload blanking period counter.

6. Apparatus as in claim 4 wherein said means for controlling thrust actuation commands comprises means for modulating the timing of said roll unloads in accordance with the yaw error measured by the DIRA following the transition to on orbit mode.

7. Apparatus for controlling momentum in a spacecraft having a long term momentum management (LTMM) controller, that estimates roll momentum, and having a yaw DIRA, that measures yaw error, comprising:

means for maintaining said yaw DIRA in the on condition, producing signals indicative of the yaw error measured, following a transition of the spacecraft to on orbit mode;

means, responsive to said yaw error indicative signals, for producing a control signal;

means for controlling roll unloads in response to said control signal to control momentum in said spacecraft; and means for switching said yaw DIRA to the off condition approximately an hour after said transition to on orbit mode.

8. Apparatus for controlling momentum in a spacecraft having a long term momentum management (LTMM) controller, that estimates roll momentum, and having a yaw DIRA, that measures yaw error, comprising:

means for maintaining said yaw DIRA in the on condition, producing signals indicative of the yaw error measured, following a transition of the spacecraft to on orbit mode;

means, responsive to said yaw error indicative signals, for producing a control signal; and means for controlling roll unloads in response to said control signal to control momentum in said spacecraft and wherein said controlling means comprises means for receiving signals transmitted to said spacecraft from a station located on the earth.

9. A method of controlling momentum in a spacecraft having a long term momentum management (LTMM) controller, that estimates roll momentum, and having a yaw DIRA, that measures yaw error, comprising the steps of:

maintaining said yaw DIRA in the on condition, producing signals indicative of the yaw error measured, following a transition of the spacecraft to on orbit mode;

determining a roll momentum, based on the yaw error measured by said yaw DIRA while in the on condition following a transition of the spacecraft to on orbit mode, and producing a signal indicative of said determined roll momentum; and controlling roll unloads in response to said signal indicative of said determined roll momentum.

10. The method of claim 9 wherein the step of determining roll momentum is carried out by the LTMM controller.

11. The method of claim 10 further comprising the step of disabling said LTMM controller from estimating roll momentum, prior to determining roll momentum based on measured yaw error.

12. The method of claim 9 further comprising the step of switching said yaw DIRA to the off condition approximately an hour after said transition to on orbit mode.

13. A method of controlling momentum in a spacecraft having a long term momentum management (LTMM) controller, that estimates roll momentum, and having a yaw DIRA, that measures yaw error, comprising the steps of:

maintaining said yaw DIRA in the on condition, producing signals indicative of the yaw error measured, following a transition of the spacecraft to on orbit mode;

producing a control signal in response to said yaw error indicative signals; and controlling roll unloads in response to said control signal to control momentum in said spacecraft and wherein said step of controlling roll unloads comprises receiving signals transmitted to said spacecraft from a station located on the earth.

14. A system for controlling momentum in a spacecraft having a long term momentum management (LTMM) controller, including a pulse frequency modulator that produces a roll momentum output signal from an estimated roll torque input, and having a yaw DIRA, that measures yaw error, comprising:

means for maintaining said yaw DIRA in the on condition following a transition of the spacecraft to on orbit mode so as to measure yaw error;

means for producing a signal indicative of the yaw error measured by said yaw DIRA during said on condition following a transition;

means, in said LTMM modulator, for disabling said estimated roll torque input and accepting said indicative signal as input, and using said indicative signal for producing a roll momentum signal, based on the yaw error measured by said yaw DIRA during said on condition following a transition; and means for controlling roll unloads in response to said roll momentum signal.

15. A system as in claim 14 further comprising means for switching said yaw DIRA to the off condition approximately an hour after said transition to on orbit mode.

16. A system as in claim 14 wherein said means for controlling roll unloads comprises means for spacing the roll unloads.

17. A system as in claim 16 wherein said means for spacing the roll unloads comprises means for modulating the timing of said roll unloads in accordance with the yaw error measured by the DIRA following the transition to on orbit mode.

18. A system as in claim 14 wherein said means for controlling roll unloads comprises means located on the earth for transmitting signals to said spacecraft.

* * * * *